United States Patent [19]

Genter

[11] Patent Number: 5,283,784
[45] Date of Patent: Feb. 1, 1994

[54] ECHO CANCELLER PROCESSING TECHIQUES AND PROCESSING

[75] Inventor: Roland E. Genter, Falls Church, Va.

[73] Assignee: Coherent Communications Systems, Hauppauge, N.Y.

[21] Appl. No.: 922,990

[22] Filed: Jul. 30, 1992

Related U.S. Application Data

[63] Continuation of Ser. No. 562,713, Aug. 3, 1990, Pat. No. 5,157,653.

[51] Int. Cl.$^5$ .......................... H04B 3/20; H04J 3/00
[52] U.S. Cl. ................................. 370/32.1; 379/409; 379/410
[58] Field of Search ............................ 370/6.32, 32.1; 379/390, 406, 410, 411, 409

[56] References Cited

U.S. PATENT DOCUMENTS

| | | | |
|---|---|---|---|
| 3,647,992 | 3/1972 | Thomas | 379/410 |
| 3,780,233 | 12/1973 | Campanella et al. | 379/411 |
| 3,836,734 | 9/1974 | Campanella et al. | 379/411 |
| 3,894,200 | 7/1975 | Campanella et al. | 379/406 |
| 4,064,379 | 12/1977 | Horna | 379/411 |
| 4,113,997 | 9/1978 | Horna | 379/411 |
| 4,144,417 | 3/1979 | Oshima et al. | 379/410 |
| 4,321,686 | 3/1982 | Horna | 379/410 |
| 4,360,712 | 11/1982 | Horna | 379/406 |
| 4,377,793 | 3/1983 | Horna | 379/411 |
| 4,577,071 | 3/1986 | Johnston et al. | 379/410 |
| 4,600,815 | 7/1986 | Horna | 379/390 |
| 4,645,883 | 2/1987 | Horna et al. | 379/406 |
| 4,752,903 | 6/1988 | Iwata et al. | 379/411 |
| 4,998,241 | 3/1991 | Brox et al. | 370/32.1 |
| 5,189,637 | 2/1993 | Eriksson | 370/32.1 |

FOREIGN PATENT DOCUMENTS 0371567 6/1990 European Pat. Off. .
WO9120149 12/1991 PCT Int'l Appl. .

OTHER PUBLICATIONS

B. Hatty and J. Sitzmann, "Application of Digital Signal Processing to Prevention of Howling in Handset--Free Telephones", in *Signal Processing III: Theories and Applications*, I. T. Young et al. (Eds.), Elsevier Science Publishers B. F. (North-Holland), 1986, pp. 1133-1136.
Supplementary European Search Report, EP 91 91 5578.

*Primary Examiner*—Douglas W. Olms
*Assistant Examiner*—Alpus H. Hsu
*Attorney, Agent, or Firm*—Dann, Dorfman, Herrell and Skillman

[57] ABSTRACT

Residual echo from an echo canceler circuit is reduced by a variable attenuator that operates in response to a processing circuit which determines and adjusts an attenuation factor. The attenuation factor is determined by comparing relative levels of the send input signal, the receive input signal, and the error signal remaining after removal of an expected echo signal from the send input signal. The variable attenuator provides linear power attenuation of the error signal in order to reduce transmission of the residual echo signal and to eliminate the perception of coupling and decoupling of the telephone connection which occurs in known echo cancelers employing center clipping. A noise injection circuit provides a noise signal that is injected into the transmitted signal in inverse proportion to the attenuation of the error signal in order to provide a constant noise level in the transmitted signal as the error signal is variably attentuated.

25 Claims, 3 Drawing Sheets

ECHO CANCELLER PROCESSING TECHIQUES AND PROCESSING

This is a continuation of copending application Ser. No. 07/562,713 filed on Aug. 3, 1990, now U.S. Pat. No. 5,157,653.

BACKGROUND OF THE INVENTION

1. Field of the Invention

This invention relates to echo cancellers which anticipate an echo signal which will be superimposed along a signal transmission path, and to subtract the anticipated echo signal from the output. A nonlinear processor or center clipper removes any residual echo that remains in the output signal after subtraction of the anticipated echo, and is arranged to remove residual echo in the output resulting from the far end speaker's signal, and to pass the signal of the near end speaker without distortion. The nonlinear processor of the invention avoids sudden and noticeable variation in the output of the echo canceller by removing residual echo proportionately rather than by operation above a threshold signal level. The nonlinear processor detects the average background noise level and proportionately injects a noise signal in the output to maintain the average level notwithstanding the variation in operation of the nonlinear processor which occurs with the presence or absence of a signal from the near end speaker and the far end speaker, respectively.

2. Prior Art

Numerous echo cancellers are known in the art and are disclosed in prior patents. The general idea of an echo canceller is to determine the transmission response of a transmission path to an impulse input over time, and to calculate an expected echo signal by applying whatever signal which may be received from a remote or "far end" speaker to the characterized impulse response. The expected echo is subtracted from the output of the echo canceller, thus cancelling echo produced by equipment at the near end. Echo can be produced in a transmission path such as a telephone line by impedance mismatches and by coupling between the send (e.g., microphone) and the receive (e.g., speaker) sections of a telephone apparatus. Typically, telephone apparatus includes an analog microphone and acoustic speaker set which is connected via a 2 wire line coupling to a digital signal transmission network through a hybrid analog coupling device and an analog/digital coder/decoder or "CODEC", which may compress and expand the respective signals to reduce the number of bits which must be transmitted over the network digitally. When a party to a conversation produces a signal, any coupling between the send and receive lines remote from that party, for example in the hybrid at the other end of the connection, allows a usually attenuated reflection of the user's signal to be returned over the transmission path, being perceived by the speaker as an echo. Typically, echo from a signal originating at a far end speaker is cancelled by an echo canceller at the near end station, and vice versa.

For purposes of this disclosure, an echo canceller is described with respect to the near end, although both ends preferably are similarly equipped. It is assumed that a two way connection is made between a near end at which the echo canceller is located, and a far end which is to be protected from echo otherwise produced by coupling at the near end. The echo canceller is connected between the transmission lines and the terminal equipment, along a send line (carrying the near end speaker's signal and any residual echo towards the far end) and a receive line (carrying the far end speaker's signal to the near end).

When the far end speaker is the only active speaker, the accuracy of echo cancellation is monitored and used to correct the factors characterizing the expected echo response, because theoretically, when the near end speaker is silent, no signal should be returning on the send-out line coupled to the transmission path. An adaptive control device progressively more accurately characterizes the expected echo, converging on an accurate characterization over a brief period of time.

An initial solution to countering echo in signal transmission was to suppress the echo returned by the near end to the far end by decoupling the send line of the near end station from the transmission line when the far end speaker was active, allowing sufficient time for any echo to subside. However, this also decouples any signal originating at the near end speaker and is noticeable to the parties to the conversation as a coupling and decoupling of the connection. This arrangement is still used with some acoustic applications such as telephone speakerphones.

Similarly, echo cancellers typically include a so-called center clipper, whose main function is to eliminate any residual echo from the send-input (SI) line. When the near end speaker is active, the center clipper is disabled or bypassed, to avoid distortion of the near end speaker's signal. The center clipper is operable when the send-output (SO) exceeds a predetermined threshold (which may be variable as a function of other factors). The center clipper is inoperable when an output higher than the threshold indicates that the near end speaker is active. Unfortunately, this produces the same sort of coupling and decoupling that is noticeable to the parties to the conversation.

When the signal falls below the predetermined threshold that would enable the center clipper, the output signal (SO) goes to zero. When the near end speech (i.e., speech applied to SI) occurs, the center clipper is bypassed, and the error signal with associated circuit noise is gated directly to the send-out (SO) port. As a result, a noise modulated signal is heard by the far end listener. The listener hears background noise (caused for example by room noise at the near end speaker's location or circuit noise in the telephone network) while the near end speaker is speaking, and absolute silence when he or she (the far end person) is speaking. This apparent coupling and decoupling of the connection is annoying, and the annoyance increases as the level of noise applied to the send-in port at the near end increases.

A further related problem with known center clippers is that the send-in noise signal can be of sufficient amplitude to exceed the predetermined threshold at which the center clipper is enabled. When noise peaks exceed the clipping threshold the center clipper is not bypassed. The effect at the far end listener is that crackles are heard rather than the expected sound of white or broadband noise as characteristic of the operative connection.

U.S. Pat. No. 4,577,071—Johnston et al discloses an echo canceller includes a center clipper which removes peaks from the send-out signal when above predetermined threshold levels. The threshold level is variable as a function of other factors, such as the extent of residual echo. However, the center clipper remains operable as a switching device, producing a coupling and decoupling that is noticeable to the listener.

The present invention eliminates these problems by a particular nonlinear processor coupled to an echo canceller in the same manner as a center clipper. The nonlinear processor includes multiplying means for attenuating the error signal over a continuous range rather than clipping the error signal when the error signal exceeds a threshold. The nonlinear processor also includes a noise injection apparatus sensing the average noise level on the line and inserting a broadband noise signal in the output at a variable amplitude as needed to maintain a constant noise level at the output as the signal from the send-in line (including noise) is being attenuated. The nonlinear processor has the advantages of a center clipper, but avoids the major drawback of known center clippers, namely the noticeable variation in the output signal produced by the center clipper toggling between an operative and an inoperative status.

SUMMARY OF THE INVENTION

It is an aspect of the invention to reduce or eliminate noticeable variations in the output signal of an echo canceller due to variations in operative status of the echo canceller with occurrence of signals at the near end, at the far end and at both ends, including low level and noise signals.

It is also an aspect of the invention to employ the average signal and noise levels at the send-input and the error line in an echo canceller to control amplitude and noise injection.

It is a further aspect of the invention to employ trigonometric (sine) functions in an average level control in an echo canceller to obtain root mean square (RMS) signal and noise levels at an average level.

These and other aspects of the invention are provided in an echo canceller for removing echo due to coupling between a received signal at a receive input and a transmitted signal at a send output, across a near end transmission path, the echo being a reproduction of a signal at a send input to the echo canceller, superimposed on a signal transmitted from a near end speaker to a far end listener. The echo canceller includes an adaptive convolution processor operable to compute an impulse response of the transmission path over time, the convolution processor being coupled to the receive input and being operable to compute expected values of the echo from the received signal and from the impulse response. A summing junction is coupled to the send input and to the convolution processor, the summing junction subtracting the expected values of the echo from said received signal as coupled to the send output, thereby producing an error signal including the signal transmitted from the near end speaker and residual echo. Average absolute values over time of the send input and the receive input are determined to obtain a send average and a receive average. A nonlinear processor is coupled to the error signal and to the send output, the nonlinear processor being responsive to the means for determining the average values and including at least one multiplier operable over a range variably to attenuate the error signal as a function of respective levels of the send average and the receive average. The nonlinear processor increasingly attenuates the error signal with increase of the receive average and decreasingly attenuates the error signal with increase of the send average. Preferably, attenuation of the error signal is increased and decreased rapidly when certain relationships between the average signals are met, and attenuation of the error signal is decreased gradually when these relationships are not met.

According to a preferred embodiment, the nonlinear processor determines a level of attenuation by incrementing and decrementing an attenuation factor between preset limits, and converts linear variation of the attenuation factor to a root mean square variation, the root mean square variation being operably coupled to the multiplier such that the attenuation is controllable based upon power level of the send input and the receive input. This can be accomplished with a sine lookup table.

An average floor noise level in the send signal is determined from an average minimum of the absolute value of the send average, and a noise injection apparatus coupled to the send output is variably operable to inject an artificial noise signal inversely proportional to a level of attenuation of the error signal by the nonlinear processor, up to a maximum of the floor noise level, whereby a sum of the artificial noise injected and attenuated noise in the signal at the send input remains substantially equal in power to a level of the floor noise level.

The level of attenuation of the error signal is determined by incrementing and decrementing an attenuation factor between preset limits, and the noise injection apparatus is responsive to the attenuation factor, via a multiplier. The attenuation, and therefore the noise injection, is altered rapidly when comparison of the average signal levels so requires, and is altered gradually otherwise to respond to near end/far end speaker conditions in a manner that is not apparent to the far end listener.

Additional aspects of the invention, and possible variations of the invention can be determined from the following discussion of exemplary embodiments thereof.

BRIEF DESCRIPTION OF THE DRAWINGS

There are shown in the drawings the embodiments of the invention as presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
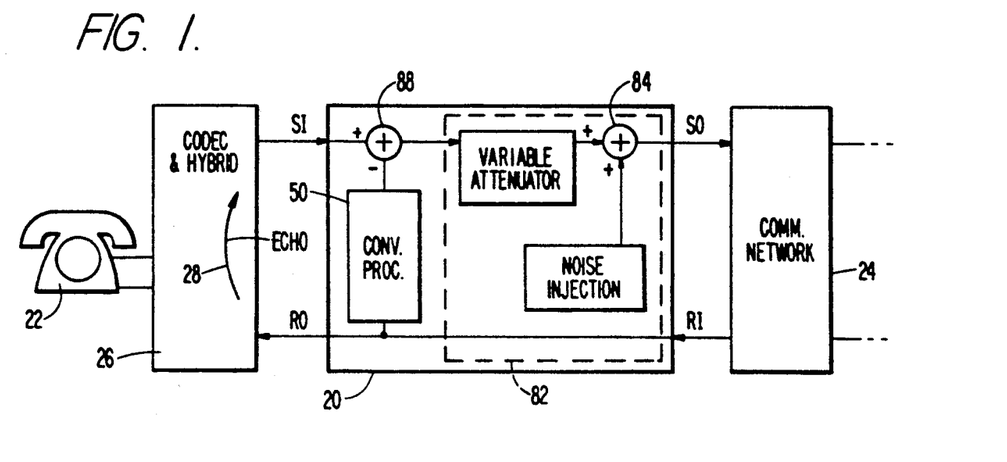
FIG. 1 is a schematic diagram illustrating an echo canceller according to the invention, at one end of a communication link.

FIG. 1 illustrates an echo canceller 20 according to the invention, as connected in practice. The echo canceller 20 is disposed at one end of a bidirectional communication link, for example between the hybrid apparatus 26 interfacing to a telephone set 22 and a digital telephone transmission network 24. Typically, an echo canceller is provided at both ends of the communication link. However, the invention is described herein with reference to the echo canceller at the "near end", i.e., the echo canceller that prevents the signal received from a remote (far end) speaker from being returned to the far end together with the signal originating with the near end speaker. The transmission network 24 is a two channel digital apparatus for handling signals in both directions. The hybrid device 26, known as a CODEC or coder-decoder, converts the two wire analog acoustic signals sent and received by the telephone device 22 to a two channel digital format for bidirectional communications on the network. The digital data comprises successive samples of the analog levels from the source, encoded in a compressed floating point logarithmic data word.

The connections to the echo canceller are designated the send and receive lines, with reference to the near side of the conversation between a user of telephone set 22 and a remote user (not shown). Due to coupling between the send and receive lines at the near end through hybrid 26 or otherwise, an attenuated representation of the signal received from the far end speaker on the receive line, could be applied to the send line. The far end speaker would perceive this attenuated version of his or her signal as an echo, the signal being returned to the far end station after a delay period which varies with the signal propagation time of the particular communication link, for example due to satellite communication links, multiplexers, repeaters, etc., disposed between the respective parties.

The echo canceller includes a convolution processor or adaptive filter 50 which develops a characterization of the impulse response of the transmission path 28 from the receive input RI to the send input SI, which characterization is applied to the signal obtained on the receive input RI to produce an anticipated echo signal. The anticipated echo signal is subtracted from the signal at the send input via summing junction 88, which signal includes the echo as well as the signal originating with the near end speaker. When the near end speaker is silent, the signal at the send input SI includes any echo, but also includes any circuit noise in the near end loop as well as any room noise picked up by the near end telephone. By monitoring the signal level after subtraction of the anticipated echo, and sensing whether the near end speaker is active, the residual echo or ERR signal at the output of summing junction 88 provides a feedback control whereby the convolution processor revises the characterization of the impulse response of the transmission path 28 to more accurately cancel the echo. Immediately upon establishing the communication link, the convolution processor 50 begins to determine the impulse response of the transmission path or echo path 28, i.e., the coupling path from the receive input RI to the send input SI. Typically, a register of factors is developed, defining the impulse response at successive sample times following the impulse. After a period of correction, a maximum extent of correction is achieved. The convolution processor is said to "converge" as it adjusts characterization of the impulse response to increase as much as possible the echo return loss (ERL) of the echo transmission path from the receive input to the send output. The echo canceller thus provides echo return loss enhancement (ERLE) which can increase the normal loss in signal amplitude around the echo path, for example, from −8 db to −38 db. Examples of convolution processor design can be found, for example in U.S. Pat. Nos. 4,064,379; 4,113,997; 4,321,686; 4,360,712; 4,377,793; 4,600,815—Horna; and, 3,780,233; 3,789,233; 3,836,734; 3,894,200—Campanella, which are hereby incorporated.

In addition to echo, the send line includes the signal originating at the near end speaker. When the result of subtracting the expected echo, i.e., the level of the ERR signal, is very low, the near end speaker is inactive and any echo is being successfully cancelled. Accordingly, it is conventional to simply zero the output of the echo canceller in this condition, via a so-called center clipper. The center clipper passes peaks of the signal at ERR to the send output SO when the signal is above a certain threshold and zeroes the signal when below the threshold. When the near end speaker is active (applying a signal to the send input SI), the near end signal together with associated background noise and circuit noise is gated through to the output, but when the center clipper is activated, the output is entirely silent. This produces an annoying coupling and decoupling that the far end listener perceives as a making and breaking of the communication link. To avoid this problem and also to deal with situations wherein it is unclear whether the near end speaker is active, the invention replaces the conventional center clipper with a nonlinear processor that suddenly or gradually adjusts the extent of coupling of the ERR signal to the output, while also injecting into the signal a variable amount of artificial background noise sufficient to maintain the average level of background noise at output SO constant. The nonlinear processor is coupled between the ERR signal and the send output SO and operates to progressively attenuate the ERR signal rather than to gate the ERR signal on or off. The average noise level is sensed in the signal and following any attenuation of the ERR signal by the nonlinear processor a supplemental noise signal is injected to maintain the background noise level in the output to the average. As a result, the far end speaker perceives little if any difference in the operation of the echo canceller between situations wherein either speaker is active, and intermediates thereof wherein the signal levels from the near and far end speakers are such as to present an ambiguous situation. For example, an ambiguous situation is presented if both speakers are active at the same time.

Figure 2:
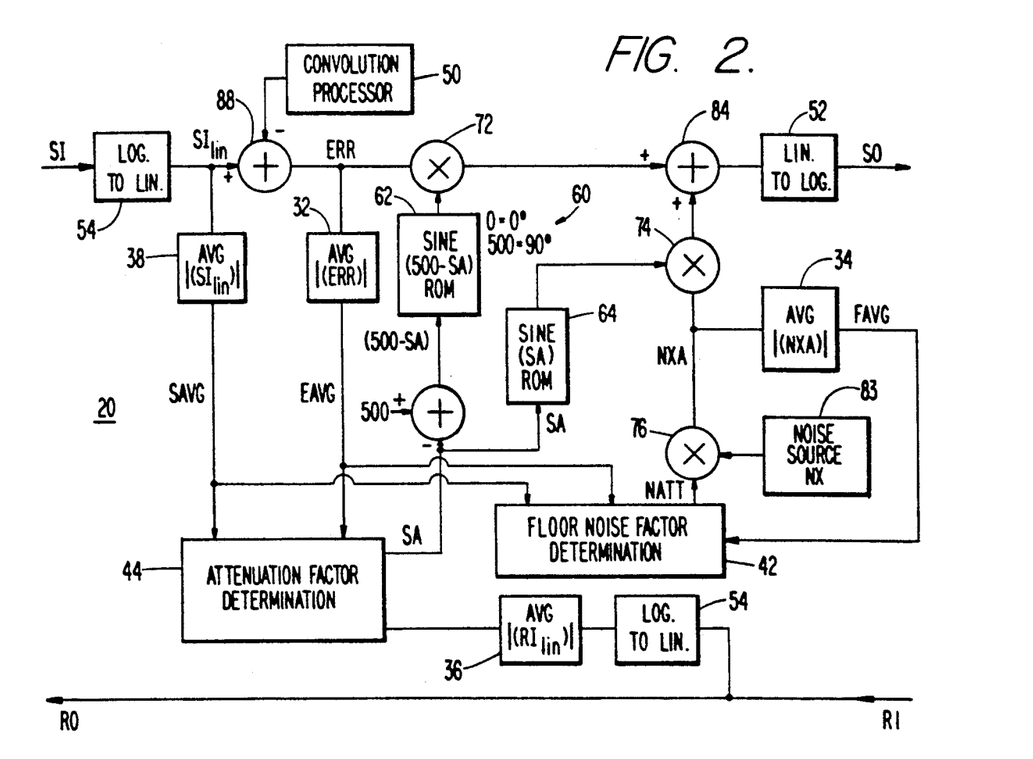
FIG. 2 is a more detailed schematic diagram illustrating the echo canceller.

As shown generally in FIG. 1 and in detail in FIG. 2, the echo canceller is coupled between the hybrid 26 and the communication link from network 24. The incoming far end signal is coupled to the receive input RI. The outgoing near end signal is coupled to the send input SI, and includes the near end speaker's signal and any echo. After processing the output of the echo canceller is applied to the communication link via send output SO. A noise source NX provides a source of white noise or broadband noise to be injected at the level required, under control of the nonlinear processor 82. The couplings between the respective inputs and outputs are shown in the drawings as single lines. However, it will be appreciated that these are digital data paths and typically are embodied as data paths for multi-bit data words representing samples of the respective signals at intervals. Within the echo canceller the data is processed in parallel words, and along lines SI, SO and RI the data typically is serial.

The digital data can encode the respective signal levels in a logarithmic floating point format. Interface elements 54 on the inputs SI, NX and RI convert logarithmic data to linear data for computations within the echo canceller 20 and interface element 52 on output SO converts the linear data back to logarithmic data for transmission. The input data from the noise source NX can also be provided in a linear format.

Noise source 83 produces signal NX in a form of samples of a random or pseudo random signal to be used to reproduce white or broadband noise. The noise data can be produced by any form of random number generator, but most conveniently the noise data is a representation of noise that is band shaped to approximate the typical noise produced in telephone circuits. The noise representation preferably is stored in read only memory (ROM) and read out repetitively.

The noise signal as provided in a linear format ($NX_{lin}$) is attenuated by application of a noise attenuation factor NATT, at multiplier 76, so as to match the amplitude of the noise at the output SO to the noise floor of the send-in signal. The noise floor level can be obtained by averaging the send-input signal in a manner that weights the average to the minimum steady state absolute value of SI, as described herein with reference to FIG. 4. The attenuated noise signal is designated NXA. This signal is applied to a second multiplier 74, used to switch the attenuated noise source to the send-out port SO via summing junction 84.

Matching the amplitude of signal NXA to the noise floor is performed as follows. An average level FAVG of signal NXA is accumulated using averaging means 34. The averaging means 34 could for example calculate the RMS value of the signal or could simply pass the absolute values (or squares) of the signal samples through a low pass filter or averaging integration technique to obtain the average absolute value of the signal. Similar averaging means 38, 32, and 36 are provided on the send input SI (producing SAVG), the error line ERR (to obtain EAVG) and the receive input RI (RAVG). For best accuracy, all the averaging circuits should use the same averaging principle and should have similar time constants.

The floor noise level is determined by computation techniques via factor determination means 42. As shown in flow diagram form in FIG. 4, if the level of EAVG falls below FAVG, variable NATT is reduced in value by a preset amount CONST[A]. Accordingly, when the input noise sample $NX_{lin}$ is multiplied by this new lower value of NATT, the amplitude of signal NXA is correspondingly decreased. If EAVG is larger than FAVG, the value of NATT and the value of NXA are increased by a preset amount CONST[C]. The value of NXA is therefore controlled so that it will match the noise floor of the ERR signal.

Figure 4:
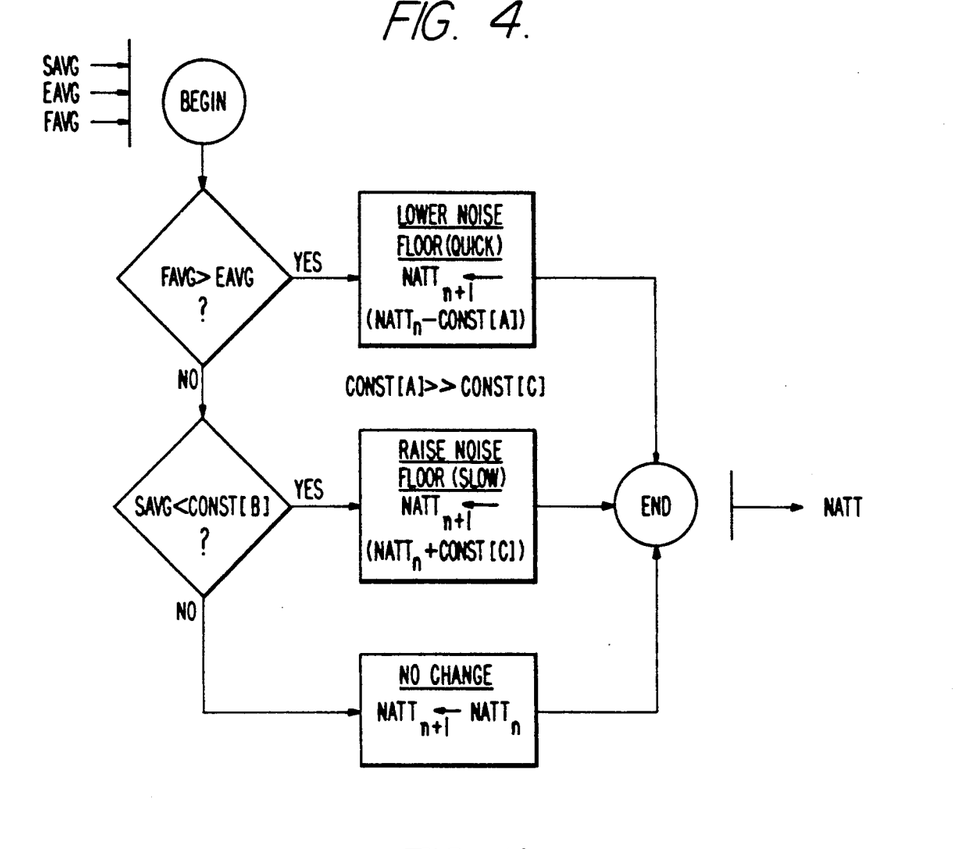
FIG. 4 is a schematic flow diagram illustrating the function of the noise injection scaling means according to FIG. 1; and, FIG. 5 is a timing diagram illustrating response of the echo canceller, and in particular the non linear processor, to situations wherein the near end and far end speakers are active.

The extent of incremental increase or decrease of NATT is determined by constants CONST[A] and CONST[C] in a manner that will cause NXA to remain at the minimum average level of SAVG, namely at the noise floor. NATT is incrementally decreased in an amount CONST[A], and incrementally increased in an amount CONST[C], and CONST[A] is much larger than CONST[C]. This biasing toward reducing the level of NATT causes the amplitude or power of NXA to always approximate the noise floor of ERR (i.e., the minimum or background noise signal level).

In the event of high amplitude voice or other signals being present at ERR a further criteria can be used to avoid an undue increase in the noise level injected as the nonlinear processor attempts to keep the output background level at an amplitude determined in part by the average ERR level, namely EAVG. When the average level SAVG of the send input $SI_{lin}$ exceeds a predetermined threshold CONST[B] (e.g., −36 DbmO) the value of NATT can be frozen at its current value.

Figure 3:
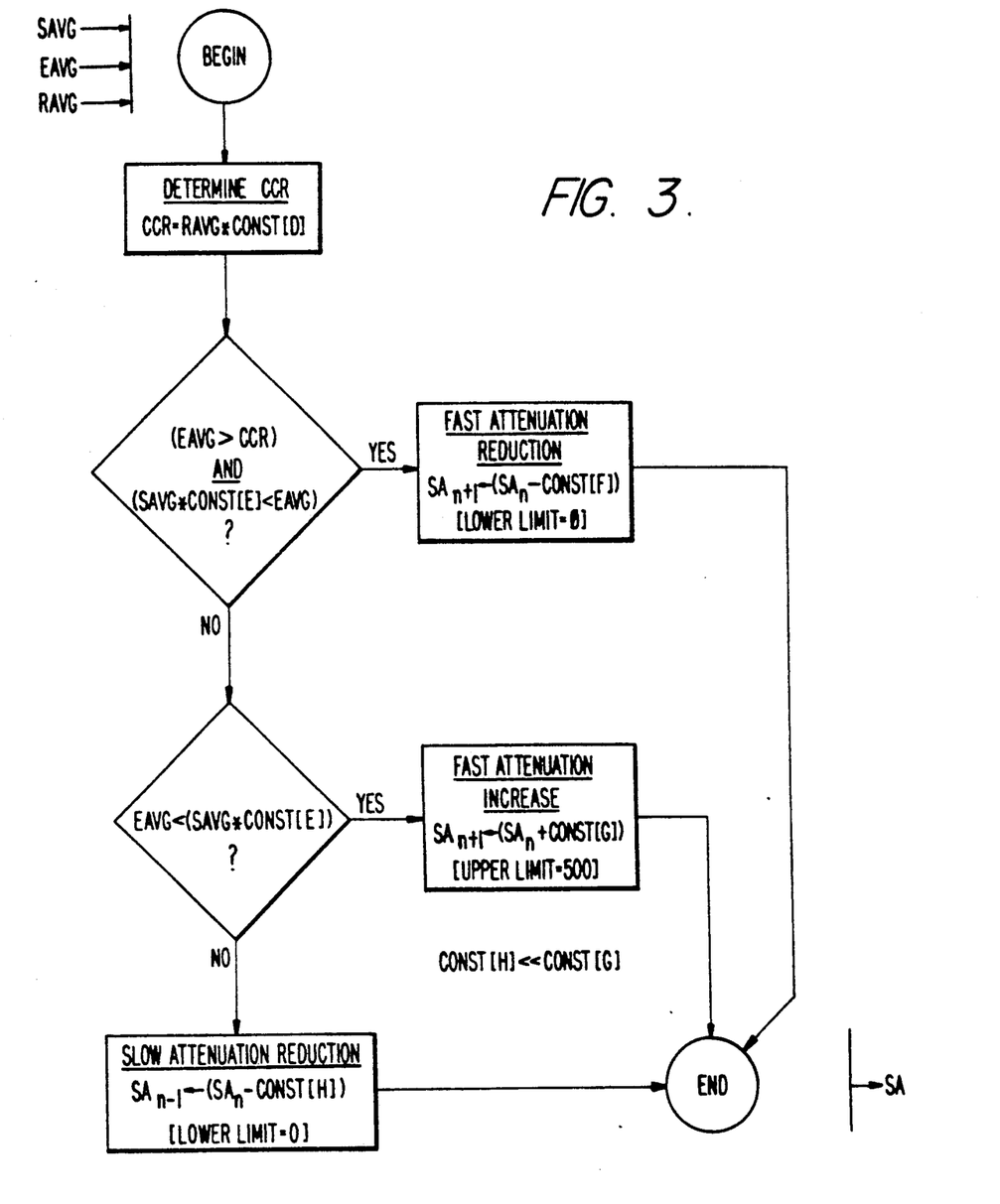
FIG. 3 is a schematic flow diagram illustrating the function of the multiplier for determining attenuation of the error signal in the invention according to FIG. 1.

The invention operates adaptively to attenuate the ERR signal as well as to inject noise. In attenuating the ERR signal, the noise therein is also attenuated. Accordingly, the amount of artificial noise is varied in inverse proportion to attenuation of the ERR signal such that the sum of actual noise from SI as passed by the attenuation of nonlinear processor 82 and the artificial noise injected remains equal to the floor noise level. Two multipliers 72 and 74 are controlled by a calculated factor SA for send attenuation and noise injection control. Factor SA is determined by factor determination means 44, the function of which is represented by FIG. 3.

The factor SA does not directly control either multiplier 72 or 74. Instead, the factor is converted to a root mean square variable so as to maintain control of power rather than amplitude. The factor SA is applied to at least one lookup table 62, 64, which stores a trigonometric sine function. The stored values in the lookup table represent sine values for zero to 90 degrees, the values varying from zero to one, encoded to a desired calculation accuracy for the controlling factor SA, for example to one part in 500, the maximum value of SA. The output of multiplier 72 that applies the looked-up sine value to ERR is driven in an opposite sense to that of the multiplier 74, because as attenuation of ERR is increased, more noise must be injected. Multiplier 74 controls the injection of the noise signal NXA, which is also controlled via multiplier 76 and factor NATT, as described above. As the value of SA goes from zero (no attenuation of ERR) to its maximum, e.g., 500 (full attenuation and full noise injection), the signal level at the output of multiplier 72 goes from its full amplitude (i.e., the full present value of ERR) to zero. Similarly, as the value of SA goes from zero to 500, the output of multiplier 74 goes from zero to its full amplitude, namely the full value of the average noise floor. In this manner, the amplitude of ERR and NXA are attenuated as a function of the calculated factor SA. The result is summed at junction 84, coupled to the send-out line SO through an optional linear to logarithmic converter 52.

The controlling input to multiplier 72 is converted from a linearly varying number (SA) to a sine function in order to properly control the RMS values of the ERR signal and the injected noise, respectively. An objective is to maintain a constant noise power at the output, for any value of SA. Accordingly, RMS(ERR floor)=RMS(NXA), regardless of the value of SA. Since power levels are proportional to the square root of the sum of squares of the amplitudes of each source, the sine lookup table provides the desired result. The sine lookup table stores the sine function for zero to 90 degrees. Separate sine lookup tables 62, 64 can be provided for SA and for 500−SA as shown, or the same table can be used for both.

The value of SA is controlled to reflect in a proportionate manner, rather than a threshold manner, whether the near end speaker, the far end speaker, or both are active. The value of SA of course should be zero when the near end speaker is active, thus causing the ERR signal to be applied directly to the send-out line SO without attenuation or injection of additional noise beyond that present already on the send-input SI. Conversely, the value of SA should be at its maximum when the far end speaker is active, such that residual echo in ERR is suppressed, and sufficient additional noise is injected into the output (notwithstanding suppression of the actual noise with suppression of ERR) to maintain the full average noise level NXA in the signal presented to the far end speaker along the send-output SO. In these two situations, controlling SA to zero or its maximum will maintain the expected signals in the send-output such that operation of the echo canceller will not produce perturbations in the signal heard at the far end. Between these two states, however, it is necessary to resolve whether or to what extent the ERR signal will be attenuated and noise will be injected.

According to the invention, a change between the two extreme modes wherein ERR is applied directly to the send-output SO, and wherein ERR is suppressed and noise is injected, is made gradually. It has been determined that a gradual change between the ERR-pass mode and the ERR-suppress (noise injection) mode is essentially transparent to the listener, while sudden changes are readily detectable. Therefore, instead of applying a zero or 500 to the sine lookup table, preferably stored in ROM, the value of SA is incremented or decremented between 500 and zero in predefined step sizes.

Attenuation factor determination means 44 calculates a variable CCR that is proportional to the amplitude of the receive signal $RI_{lin}$, from the far end talker, preferably the average amplitude RAVG of the absolute value of $R_{lin}$. Operation of factor determination mean 44 is detailed in FIG. 3. The specific ratio of the proportion CONST[D] of CCR to RAVG, can be larger or smaller as determined from the echo return loss (ERL) and echo return loss enhancement (ERLE) considerations. In any event, when the near end talker speaks, two internal criteria are met. EAVG becomes larger than CCR and the loss across the summing node 88 that produces the ERR signal essentially goes to zero since the signal from the far end does not correlate very well with the signal from the near end speaker. Therefore, when EAVG>CCR, and (SAVG*EAVG)[E]* EAVG[E], SA is decremented rapidly to zero. CONST[E] can be chosen to reflect the desired echo return loss enhancement (ERLE) sensitivity. Decrementing SA causes the voice signal from the near end speaker to be coupled to the send-output SO (and decouples injection of additional noise). Accordingly, more of the near end send-input is sent to the far end. SA is decremented successively, for example at every data sample, in steps equal to CONST[F]. CONST[F] is set to a value permitting decrementing to zero quite rapidly, for example within two milliseconds of initiation of a signal at SI.

When a far end speaker is present, then the echo signal applied to the send-in port SI correlates with the estimated echo from the correlation process. This produces an echo return loss across the summing point 88 producing the ERR signal, i.e., SAVG*CONST[E] increases to exceed EAVG, defining a threshold or a sensitivity. In other words, a far end echo signal is being received at the send-in port SI and accordingly SA should be incremented to block the residual echo signal from being returned to the far end. SA is incremented rapidly in this situation, in steps equal to CONST[G], and to a limit of the maximum value of SA, in this example 500.

If neither of these situations is met, for example due to silence from both the near end and the far end, then SA is slowly decremented to zero. Preferably SA is decremented to zero over one to five seconds. This progressively couples the send input SI to the send output SO, and decouples the injection of artificial noise into the signal transmitted to the far end.

Figure 5:
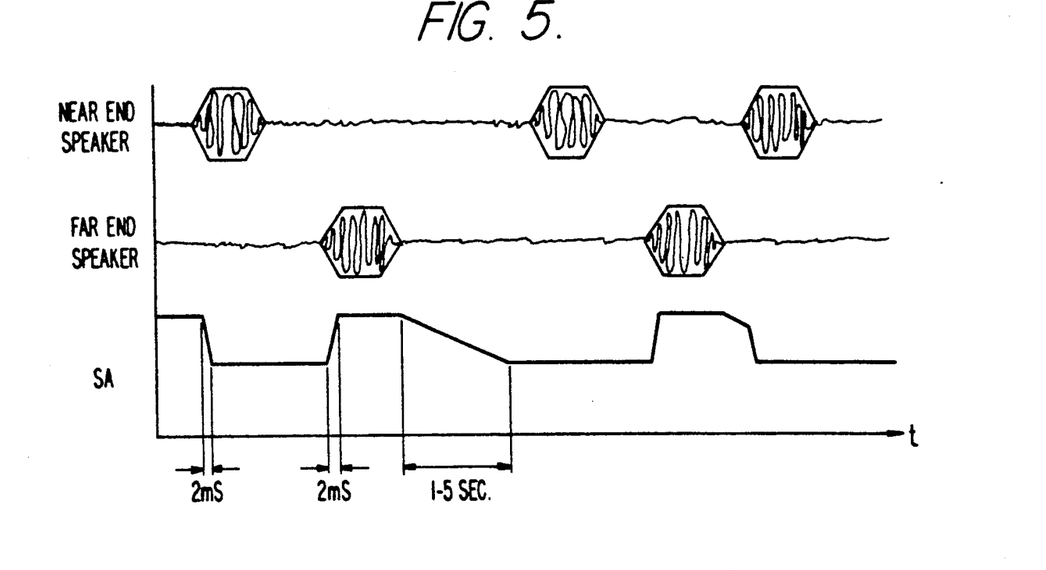

FIG. 5 is a timing diagram illustrating the variation in SA over time with the occurrence of signals at the near end and at the far end. As shown therein, the device of the invention causes SA to respond rapidly to speech at the near end or at the far end. In the case of double talk, the conditions EAVG>SAVG*CONST[E] and EAVG>CCR become true, giving priority to the near end talker. It is more important not to clip the near end talker's speech in this situation, than to try to block a small residual echo that is possibly being masked by the near end talker's speech anyway. Thus, the device responds adaptively to the situation. Upon cessation of the near end signal, SO remains coupled to ERR until far end signal is detected. For optimal coupling of the near end signal to the far end upon cessation of the far end signal, SI is slowly (1–5 seconds) coupled to SO and noise NXA is slowly decoupled from SO. With silence from both ends, the device slowly couples the actual send-in signal to the send output. Inasmuch as the changes are gradual, the far end listener does not perceive any apparent variation in operation of the echo canceller (in particular variations in noise and echo that would otherwise seem to represent coupling and decoupling of the communication link).

The invention accordingly is an echo canceller 20 for removing echo due to coupling between a received signal at a receive input RI and a transmitted signal at a send output SO, across a near end transmission path 28, the echo being a reproduction of a signal at a send input SI to the echo canceller 20, superimposed on a signal transmitted from a near end speaker to a far end listener, the echo canceller includes an adaptive convolution processor 50 operable to compute an impulse response of the transmission path 28 over time, the convolution processor 50 being coupled to the receive input RI and being operable to compute expected values of the echo from the received signal and from the impulse response. A summing junction 88 is coupled to the send input SI and to the convolution processor 50, the summing junction 88 subtracting the expected values of the echo from said received signal as coupled to the send output, thereby producing an error signal ERR including the signal transmitted from the near end speaker and residual echo. Means 38, 36 determine average absolute values over time of the send input SI to obtain a send average SAVG and of the receive input to obtain a receive average RAVG. A nonlinear processor 82 is coupled to the error signal ERR and to the send output SO, the nonlinear processor 82 being responsive to the means 38, 36 for determining the average values SAVG, RAVG and including at least one multiplier 72 operable over a range variably to attenuate the error signal ERR as a function of respective levels of the send average SAVG and the receive average RAVG. Apart from certain exceptions, the nonlinear processor 82 increasingly attenuates the error signal ERR with increase of the receive average RAVG and decreasingly attenuates the error signal ERR with increase of the send average SAVG. The attenuation SA of the error signal ERR is altered rapidly when certain relationships between average signal levels are met, which indicate that one of the speakers is active. The attenuation SA is altered gradually otherwise. The relationships, as shown in FIGS. 3 and 4, concern comparisons of the send, receive and error averages, and can include comparisons to predetermined levels as well. The predetermined levels can be set partly as a function of levels of the averages.

The nonlinear processor 82 determines a level of said attenuation by incrementing and decrementing an attenuation factor SA between preset limits. Means 60, 62, 64 are provided for converting linear variation of the attenuation factor SA to a root mean square variation, the root mean square variation being operably coupled to the multiplier 72 such that the attenuation is controllable based upon power level of the send input SI and the receive input RI. The means for converting the linear variation of the attenuation factor to a root mean square variation can include means 62, 64 effecting a trigonometric conversion, for example a sine function lookup table.

In order to control injection of an appropriate amount of artificial noise, means 42 determines an attenuation factor NATT that produces a noise signal NXA that is equal to the noise floor of signal ERR. The noise floor signal is variably coupled to the send output SO so as to inject an artificial noise signal at a level necessary to maintain a constant noise level at the output. Attenuation of coupling between the noise floor source signal NXA and the output SO is inversely proportional to attenuation of the error signal ERR by the nonlinear processor 82. Therefore, the sum of the artificial noise injected and the attenuated noise from the signal at the send input remains substantially equal to the noise floor level.

The nonlinear processor 82 determines a level of attenuation of the error signal ERR by incrementing and decrementing the attenuation factor SA between preset limits, and the noise injection apparatus 74, 84 is responsive to the same attenuation factor SA controlling attenuation of ERR.

Preferably, means 60 are provided for converting linear variation of the attenuation factor SA to a root mean square variation, the root mean square variation being operably coupled to the multiplier 72 or 74 such that the attenuation and noise injection apparatus are controllable based upon power levels. The nonlinear processor 82 can comprise at least two multipliers 72 and 74 responsive to the attenuation factor SA, one 72 of the two multipliers applying a variable attenuation to a sum of the send input SI and an output of the convolution processor 50 and a second 74 of the two multipliers applying the variable attenuation to an average noise floor level NXA, an output of the second of the multipliers 74 being added to said sum of the send input and the output of the convolution processor 50 at a summing junction 84.

A third multiplier 76 is operable to apply a constant level noise input NX to a floor noise level factor NATT determined by comparison of the send average SAVG to the noise average FAVG and means 42 are provided for biasing the floor noise level factor NATT downwardly for establishing the floor noise level NXA.

The invention preferably includes both noise injection and variable attenuation of ERR. However, it is conceivable that only one of these two features may be provided apart from the other. Similarly, either a full function echo canceller or a nonlinear processor including the features disclosed would come within the scope of the invention as well. Having been disclosed, additional variations on the subject matter will become apparent to persons skilled in the art. Reference should be made to the appended claims rather than the foregoing description of exemplary embodiments in order to assess the scope of the invention in which exclusive rights are claimed.

I claim:

1. A device for reducing residual echo in an echo canceler adapted to receive a send signal from a near-end telecommunication device and a receive signal from a remote telecommunication device, said echo canceler providing an error signal by removing an expected echo of the receive signal from the send signal, said device comprising:

attenuation factor determining means connected to receive the send signal, the receive signal, and the error signal for generating a first attenuation signal in response to the send, receive, and error signals; and a signal attenuator connected to receive the error signal and responsive to the first attenuation signal for attenuating the error signal, whereby an attenuated error signal is provided.

2. A device according to claim 1 wherein said attenuation factor determining means comprises signal comparison means for comparing the send, receive, and error signals and for adjusting the magnitude of the first attenuation signal.

3. A device according to claim 2 wherein said signal attenuator comprises signal conversion means for converting the first attenuation signal to a second attenuation signal having a magnitude which varies as a function of the magnitude of the first attenuation signal, said function being defined such that the power of the error signal is attenuated based on amplitude levels of the send and receive signals.

4. A device according to claim 3 wherein said signal conversion means comprises a look-up table containing a plurality of discrete values of said function, each of said discrete values corresponding to a discrete magnitude of said first attenuation signal.

5. A device according to claim 2 wherein said signal comparison means comprises:

rapid attenuation increase means for increasing the first attenuation signal at a rapid rate when the error signal is less than a preselected proportion of the send signal.

6. A device according to claim 5 wherein said signal comparison means further comprises:

rapid attenuation reduction means for decreasing the first attenuation signal at a rapid rate when the error signal is greater than a preselected proportion of the receive signal and greater than a preselected proportion of the send signal.

7. A device according to claim 6 wherein said signal comparison means further comprises:

slow attenuation reduction means for decreasing the first attenuation signal at a slow rate when the error signal is less than a preselected proportion of the receive signal and greater than a preselected proportion of the send signal.

8. A device according to claim 1 further comprising:

noise injection means, responsive to said send signal, said error signal, and said first attenuation signal for providing a floor noise signal and injecting the floor noise signal into the attenuated error signal.

9. A device according to claim 8 wherein said noise injection means comprises noise attenuation means for attenuating the floor noise signal before it is added to the attenuated error signal such that a substantially constant noise level is maintained in the attenuated error signal.

10. A device according to claim 9 wherein
said noise injection means further comprises a source of electronic noise; and
said noise attenuation means comprises:
   floor noise factor determination means responsive to the send signal and the error signal for providing a first noise attenuation signal; and
   a first noise attenuator responsive to the first noise attenuation signal and the electronic noise for attenuating the electronic noise such that the electronic noise is equivalent to noise present in the error signal.

11. The device of claim 10 further comprising noise attenuation reduction means for reducing said first noise attenuation signal when the error signal level is below the first attenuated noise signal level.

12. The device of claim 11 further comprising noise attenuation increasing means for increasing said first noise attenuation signal when the send signal level is below a predetermined threshold.

13. A device according to claim 10 wherein said noise attenuation means further comprises a second noise attenuator responsive to the first attenuation signal for attenuating the floor noise signal such that the floor noise signal is adjusted in a manner inversely proportional to the attenuation of the error signal.

14. A method for processing a send signal from a near-end telecommunication device to remove echo therefrom resulting from coupling between said send signal and a receive signal from a remote telecommunication device, said method comprising the steps of:
   computing an expected echo signal;
   removing the expected echo signal from the send signal thereby producing an error signal having a residual echo component;
   comparing the send, receive, and error signals;
   determining an attenuation factor on the basis of said comparison; and
   attenuating the error signal in accordance with said attenuation factor so that the residual echo component is reduced in desired manner.

15. A method of canceling echo as recited in claim 14 wherein said determining step includes the step of decrementing the attenuation factor to a value that provides minimum attenuation of the error signal when the error signal exceeds a preselected proportion of the receive signal and the error signal exceeds a preselected proportion of the send signal.

16. A method of canceling echo as recited in claim 15 wherein the attenuation factor is decremented to the minimum attenuation value within about 2 milliseconds.

17. A method of canceling echo as recited in claim 14 wherein said determining step includes the step of incrementing the attenuation factor to a value that provides maximum attenuation of the error signal when the error signal is less than a preselected proportion of the send signal.

18. A method of canceling echo as recited in claim 17 wherein the attenuation factor is incremented to the maximum attenuation value within about 2 milliseconds.

19. A method of cancelling echo as recited in claim 14 wherein said determining step includes the step of decrementing the attenuation factor to a value that provides minimum attenuation of the error signal when the error signal is less than a preselected proportion of the receive signal and greater than a preselected proportion of the send signal.

20. A method of canceling echo as recited in claim 19 wherein the attenuation factor is decremented to the minimum attenuation value within about 1 to 5 seconds.

21. A method of canceling echo as recited in claim 14 further comprising the step of injecting noise into said error signal in inverse proportion to attenuation of the error signal.

22. A method of canceling echo as recited in claim 21 further comprising the steps of:
   measuring a background noise level of said error signal; and
   limiting the noise injected into said error signal to not more than the measured background noise level.

23. A method of canceling echo as recited in claim 22 wherein the step of limiting the injected noise comprises the steps of:
   determining a background noise attenuation factor and attenuating the injected background noise in accordance with the background noise attenuation factor whereby an attenuated background noise signal is provided.

24. A method of canceling echo as recited in claim 23 wherein the step of determining the background noise attenuation factor comprises the step of decrementing the background noise attenuation factor when the error signal is less than the attenuated background noise signal.

25. A method of canceling echo as recited in claim 23 wherein the step of determining the background noise attenuation factor comprises the step of incrementing the background noise attenuation factor when the send signal is less than a preselected threshold value.

* * * * *